(12) United States Patent
Ledbetter et al.

(10) Patent No.: US 8,156,639 B1
(45) Date of Patent: Apr. 17, 2012

(54) PORTABLE BATTERY OPERATED MOTORIZED RACKING TOOL

(76) Inventors: Finley Lee Ledbetter, Argyle, TX (US); Ashley Sue Ledbetter, Argyle, TX (US)

( * ) Notice: Subject to any disclaimer, the term of this patent is extended or adjusted under 35 U.S.C. 154(b) by 85 days.

(21) Appl. No.: 12/775,285

(22) Filed: May 6, 2010

(51) Int. Cl.
*H02B 3/00* (2006.01)

(52) U.S. Cl. ........... 29/764; 29/270; 29/278; 200/50.21; 200/50.24

(58) Field of Classification Search .......... 29/270, 29/278, 762, 764, 426.5, 756; 200/50.21, 200/50.24

See application file for complete search history.

(56) References Cited

U.S. PATENT DOCUMENTS

| | | | |
|---|---|---|---|
| 4,331,883 A * | 5/1982 | Vitaloni | 307/150 |
| 5,453,587 A * | 9/1995 | Hurley et al. | 200/50.24 |
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 * | 10/2005 | Miller | 200/50.21 |
| 7,019,230 B1 | 3/2006 | Vaill et al. | |
| 2010/0024191 A1 * | 2/2010 | Ledbetter | 29/428 |

* cited by examiner

*Primary Examiner* — Livius R Cazan
(74) *Attorney, Agent, or Firm* — Buskop Law Group, PC; Wendy Buskop

(57) ABSTRACT

A portable power motorized racking tool having a front plate and a back plate disposed opposite, a first and second handle on the front plate, a motor mount secured to the front plate with a motor mount extension protruding through a shaft hole, a motor with torque limiting clutch attached to the motor mount, a battery between the plates supported by 4 braces connected to the front and back plates containing the battery; a power cable connecting the battery to the motor, a start button with ignition wire connecting the start button to the battery secured to the front plate for actuating the motor, a rotatable shaft connected to the torque limiting clutch and contained by the motor mount extension, an install switch and a remove switch each connected to the motor for rotating the rotatable shaft, and a universal tool connected to the rotatable shaft.

16 Claims, 5 Drawing Sheets

PORTABLE BATTERY OPERATED MOTORIZED RACKING TOOL

FIELD

The present embodiments generally relate to a portable, lightweight, motorized tool for installing and removing electrical components in a mechanical room or electrical room of a facility.

BACKGROUND

A need exists for a small lightweight tool that can be held by a human operator against electrical equipment to remove or install circuit breakers to limit the amount of time that the operator has to stand in front of an arc flash hazard.

A need exists for a lightweight tool that limits the amount of cardio-vascular exertion performed by a human operator in a heavy arc flash suit, which can also be referred to herein as "personal protective equipment or PPE".

A further need exists for a lightweight, portable, easily transported tool that is battery operated without the need for a power cord, thereby eliminating any tripping hazard.

The present embodiments meet these needs.

BRIEF DESCRIPTION OF THE DRAWINGS

The detailed description will be better understood in conjunction with the accompanying drawings as follows.

Figure 1:
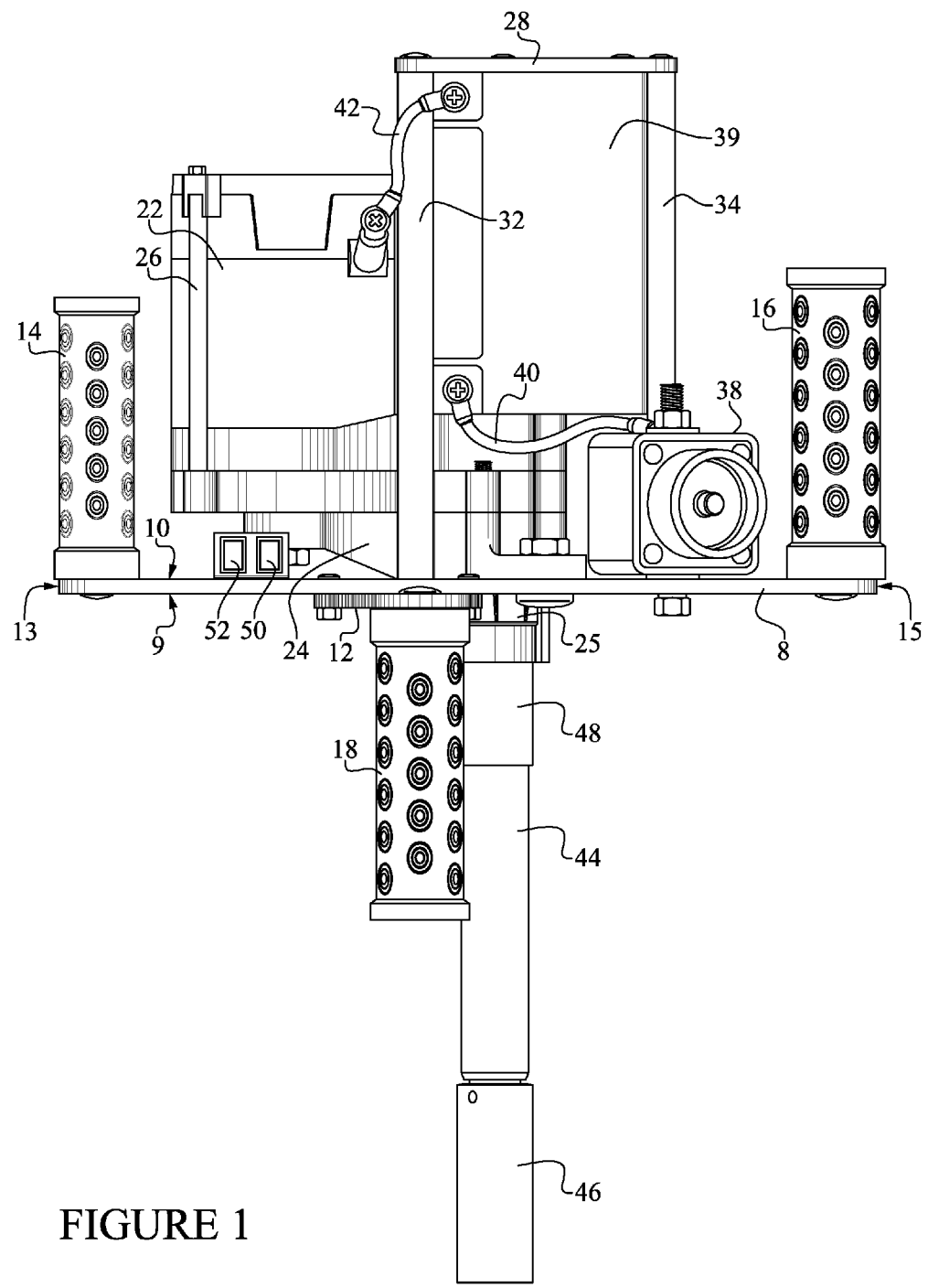
FIG. 1 is a top view of the tool.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that each can be practiced or carried out in various ways.

One or more embodiments relate to a battery powered motorized racking tool that can have a front plate with a shaft hole and a back plate disposed opposite the front plate. The tool can have a first and second handle on the front plate.

A motor mount can be secured to the front plate with a motor mount extension protruding through the shaft hole.

A motor can rotate a torque limiting clutch. The motor can be attached to the motor mount.

A battery can be positioned between the plates supported by three and up to four braces, or possibly more braces.

The braces can connect the front and back plates and can contain the battery and the motor.

A power cable can connect the battery to the motor.

The tool can include a start button. An ignition wire can connect the start button to the battery. The start button can be secured to the front plate for actuating the motor.

A rotatable shaft can connect to the torque limiting clutch and can be contained by the motor mount extension.

Two switches, an install switch and a remove switch, can be connected to the motor for rotating the rotatable shaft in different directions, such as clockwise and counterclockwise.

A universal tool can be connected to the rotatable shaft.

Embodiments of the invention provide a lightweight tool, weighing less than about 80 pounds and as little as 20 pounds.

Besides being lightweight and operable by a single person, embodiments of the invention are battery operated so that no electrical cords need be dragged around, and no outlet need be found to install or remove electrical equipment, such as circuit breakers in an electrical room of a chemical plant or an electrical room of a hospital.

Additionally, embodiments of the invention have a small overall size, which makes it easy to store, easy to transport, and easy to lift by one person.

The overall size of the battery operated portable motorized racking tool can be from about 12 inches to about 20 inches in width, from about 8 inches to about 13 inches in length, and can have a height of less than about 12 inches. In embodiments, the tool can have a height from about 6 inches to about 2 feet, a length from about 1.5 inches to about 3 feet, and a width from about 6 inches to about 2 feet.

A feature of embodiments of the invention is that the rotatable shaft can have different diameters that can be usable herein.

In embodiments, the rotatable shaft can engage different components or clutches without being excessively large. For example the inner diameter of the rotatable shaft can be from about ½ an inch to about 1 inch.

In embodiments, the rotating shaft may have a plurality of locking holes enabling the shaft to engage different types of connectors, different types of universal tools, or different types of components.

This portable motorized tool can enable users or operators to remove or install electrical components in an arc flash zone and in an arc flash suit in a minimal amount of time, as the motorized features with finger tip operation enable the user in the arc flash rubberized suit to install or remove in $\frac{1}{10}^{th}$ the time otherwise needed for manual operation.

This tool can be a speedy solution for the users, making users safer on the job, with less time in front of the potential hazardous switch gear that could arc flash.

Many times, users in arc flash suits get very hot during manual install and removal of electrical components, such as circuit breakers. Some operators even have heart attacks during manual install and removal of circuit breakers.

This tool can not only reduce operator/user time in hot airless heavy rubber arc flash suits, but additionally can prevent overheating of the user. Overheating is less likely due to the lighter carrying load of the tool, thereby preventing heart attacks that do occur to users in the arc flash suits.

The tool reduces heat stress on the user by being a lightweight yet battery powered single man liftable universal racking tool.

The tool can prevent tripping by users since it can have no cords to fall over during tool use. The tool can be cordless.

The lightweight tool can be capable of removing or inserting low voltage, such as up to 1000 volt electrical equipment, and medium voltage (such as between 1000 volts and 20 kV) electrical equipment, which can be rotary circuit breakers, all while the operator holds the tool.

The tool can be lightweight, user friendly, and can require no modifications to the switchgear or circuit breakers.

The handles of the tool can have an ergonomic design for ease of holding in gloves in embodiments.

The tool can allow the user to stand from about 2 feet to about 4 feet away from the switch gear and only touch the circuit breaker or switch gear with the tool while holding onto insulated handles without the need for a power extension cord.

The tool can generally include a front plate with a front plate side, a back plate side, and a shaft hole that can be centrally disposed.

The front plate can be aluminum or steel from about ⅛ inch thickness to about ¾ inch in thickness.

The front plate can be coated with an impact resistant material, such as polyurethane, an anticorrosion material, or anti-rust material. Insulation can be coated on either side of the plate to reduce sparking.

The shaft hole can have a diameter from about ¼ inch to about ¾ inch through which a portion of the motor mount, or a portion of a rotatable shaft can pass.

The front plate can be rectangular in shape or can have a curvilinear shape with elements removed so that the front plate can be as small as possible while supporting the motorized components and battery.

A back plate can be disposed opposite the front plate. The back plate can be formed from the same material as the front plate, or a different material. The back plate can be strong enough to support the weight of the motor, switches, and batteries without deforming.

The back plate can also be coated with the same materials as the front plate or different materials.

The back plate can have portions removed as well, in order to have as small a plate as possible while supporting the other components.

In embodiments, the portion removed from the back plate can be the logo or name of the manufacturer or owner of the tool, such as "CBS ARCSAFE."

At least two handles and possibly three handles can be used in embodiments of this tool. Four handles may be usable as well. Two of the handles can be identical in construction, the third and fourth handles can have grips.

The handles can be completely eliminated in embodiments, and portions of the front plate can function as the handles in embodiments.

A first handle can be disposed on a first end of the front plate. The first handle can be attached to a back side of the front plate.

Parallel to the first handle, but in a spaced-apart relationship, can be a second handle also affixed to the front plate but on a second end and also on the back side.

The handles can be straight rods with insulated grips, much like handles for bicycles.

A motor mount can be made of metal and have a very small overall size, such as about 1 cubic foot.

All components of this tool, except for the rotatable rod, can be contained within the perimeter of the front plate and between the front plate and the back plate.

The motor mount can be made from a lightweight aluminum, or possibly a reinforced plastic. The back plate can be made from the same materials. The front plate can be stronger than the back plate, and can resist deformation in the presence of impacts and high temperatures of up to 212 degrees F.

The motor mount can have a motor mount extension that can protrude through the shaft hole. The motor mount can be attached to the front plate on the back side. Secured within the motor mount can be a motor such as a single speed motor that can run from about 50 rpm to about 150 rpm.

The motor can be cylindrical with a square face plate for attaching to the front plate. The cylindrical motor can contain an integral rod for engagement with a rotatable shaft or other universal tool.

The cylindrical battery operated motor can be lightweight, weighing no more than about 1 pound, and can have a body of about 14 centimeters connected to a gear box and a face plate on the gear box with a collar having an opening allowing the rotating engagement or coupling of the motor to pass and freely rotate. The motor can be better understood with reference to the Figures. The motor can be a 12 volt, 92 watt, 2300 rpm 36:1 and 64 rpm DC gear motor.

The motor can be operated by a DC battery that can be rechargeable. The battery can be located between the front and back plates and within the perimeters of both plates.

The DC battery supply can provide at least 12 volts. The battery supply can be a combination of lower voltage batteries connected in series, can weight from about 1 pound to about 2 pounds, and can provide the at least 12 volts. For example, a 9 volt battery can be connected to a 3 volt battery in series. A single 12 volt battery can also be used.

In place of or in addition to a battery, a fuel cell can be used to run the lightweight motor. A self contained fuel cell can allow for a very long life for the tool without the need for replacement. The fuel call can be rechargeable with the addition of a fuel and oxidant, allowing the tool to be reusable without replacing fuel cells.

At least four braces, which can each be metal rods having a diameter of from about 1 inch to about 4 inches surrounded by an insulating material such as plastic, can be fastened between the front plate and the back plate. Each metal rod can be from about 6 inches to about 12 inches long and can have a diameter from about ¼ inch to about ½ inch. The covering insulation can be from about 1/16 to about ⅛ inch thick, and additional foam can be on the handles to give the operator softness when gripping the handles, reducing the infliction of carpal tunnel syndrome and other hand ailments that occur to users of devices requiring gripping for extended periods of time.

A power cable can be used, such as a flexible insulated cable, to connect the portable power device such as the battery to the motor.

A removable torque limiting clutch can be used to engage the coupling of the gear box of the motor.

A start button can be secured to the back plate side of the front plate which can connect to an ignition wire that can engage the DC battery, fuel cell, or other portable power supply.

A rotatable shaft can engage the torque limiting clutch and can be contained by the motor mount extension at one end for a space of from about ¼ inch to about 2 inches, to ensure a reliable engagement with the rotating shaft and the tool.

An install switch can connect to the motor for rotating the rotatable shaft in a first direction and a remove switch can connect to the motor for rotating the rotatable shaft in a second direction opposite the first direction.

A universal tool can be used to connect to the rotatable shaft for engaging electrical equipment for removal, maintenance, or installation such as a circuit breaker or other switch gear in an electric room of a plant or facility that requires maintenance.

Use of the tool can allow a facility to comply with applicable federal, state, local and other safety regulations and procedures easily, and can provide a higher level of safety for its people.

To operate the tool, a user can select an electrical equipment specific tool for use in the removal or installation of a certain piece of electrical equipment.

The specific tool can be attached to the universal tool of the battery (or portable power) operated motorized racking tool.

The motor of the portable powered motorized racking tool can be activated by depressing the "on" button which can connect the portable power supply to the motor.

The operator can connect the universal tool of the portable powered motorized racking tool to the electrical equipment and can hold the portable powered motorized racking tool against the electrical equipment.

The operator can then select a direction, such as clockwise or counterclockwise, for rotation for a rotatable shaft of the portable powered motorized racking tool by depressing an install button which can rotate the shaft in a first direction or by depressing a remove button which can rotate the shaft in a second direction opposite the first direction.

The operator can press and click the install button, thereby allowing continued rotation in the first direction until the operator presses the button again. The operator can press or click the remove button allowing continued rotation in the second direction. The "on" button can be depressed a second time to turn off the motor. The operator can grab the tool firmly without having to separately manage the install and remove buttons or keep them depressed, as they can stay depressed automatically. The "automatic" rotation is a feature of embodiments of this lightweight device.

The portable powered motorized racking tool can be held against the electrical equipment until the electrical equipment has been removed, installed, or tested.

The battery or battery assemblage can be connected to a separate charger for recharging after use.

As part of the method, the tool can be contained in a carrying case with the charger when not in use.

This method of use can be applied to electrical equipment that can include low voltage circuit breakers (up to 1000 volts), medium voltage circuit breakers (1000 to 20 kV), switch gear, motor control centers, or other similar contactor or motor starters.

Fuel cells usable in the tool and method can include the "nano-sized" variety of fuel cells, and the fuel cells can be used in series or as a single unit. The fuels cells can be tiny portable fuel cells.

Turning now to the figures, FIG. 1 is a top view of a three handle embodiment of the portable powered motorized racking tool.

The tool can have a front plate 8 and a handle plate 12 attached to the front plate 8 on a first plate end 13. The front plate 8 can have a front plate side 9.

The tool can have a first handle 14 secured to the front plate 8 on the first plate end 13, and a second handle 16 secured to the front plate 8 in parallel with the first handle 14 on a second plate end 15.

A third handle 18 can be attached to the handle plate 12.

A motor 22 can be attached to a motor mount 24 that can have a motor mount extension 25. A portion of the motor mount extension 25 can protrude through the shaft hole shown in FIG. 2.

A first motor rod 26 can be attached to the motor mount 24 and can hold the motor 22 to the motor mount 24.

The first motor rod 26 the motor mount does not turn and is a stable replaceable reinforcing rod for holding the motor 22 to the motor mount 24.

Four braces, including braces 32 and 34, can hold the motor 22 and motor mount 24 between the front plate 8 and a back plate 28.

The back plate 28 can be connected to the front plate 8 with a second brace 32 and a third brace 34.

The motor 22 can be actuated by a start button 38 that can connect to a battery 39.

An ignition wire 40 can run from the start button 38 to the battery 39. A power cable 42 can run from the battery 39 to the motor 22.

The motor 22 can rotate a rotatable shaft 44 to which can be attached a universal tool 46.

An install switch 50 and a remove switch 52 can connect to the motor 22 to control rotation in a first direction for installing a component, and rotation in a second direction opposite the first direction for removing a component.

The front plate 8 can have a back side 10.

A clutch 48 can be attached to the motor 22.

Figure 2:
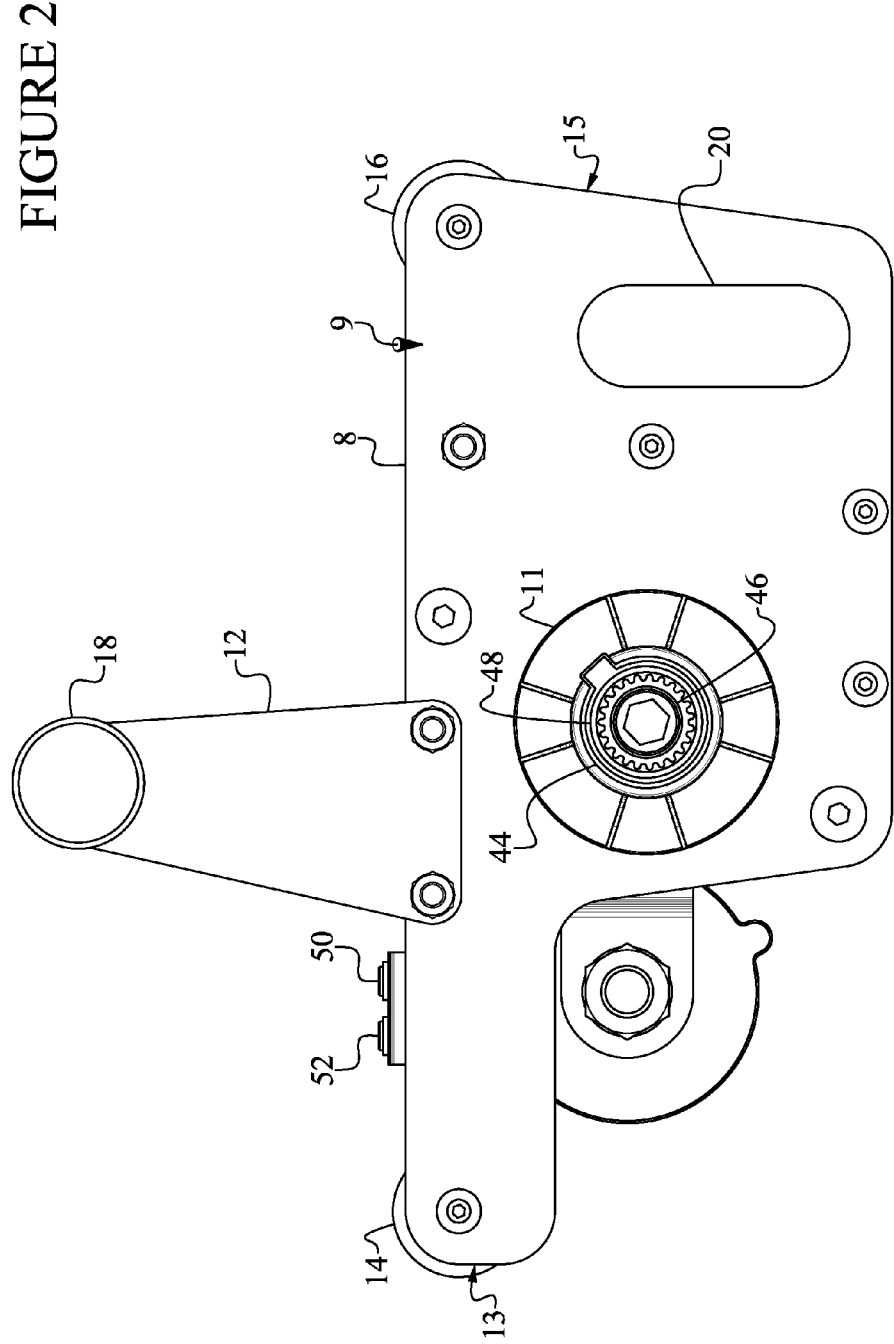
FIG. 2 is a front view of the tool.

FIG. 2 is a front view of the battery powered motorized racking tool.

The tool can include a shaft hole 11 and a handle hole 20, which can be formed in the front plate 8 as an additional hand hold for an operator.

The motor mount extension can protrude through the shaft hole 11.

The shaft hole can be centrally positioned through the front plate 8 for improved balance when using the tool due to a balanced weight distribution of components on the tool.

Figure 3:
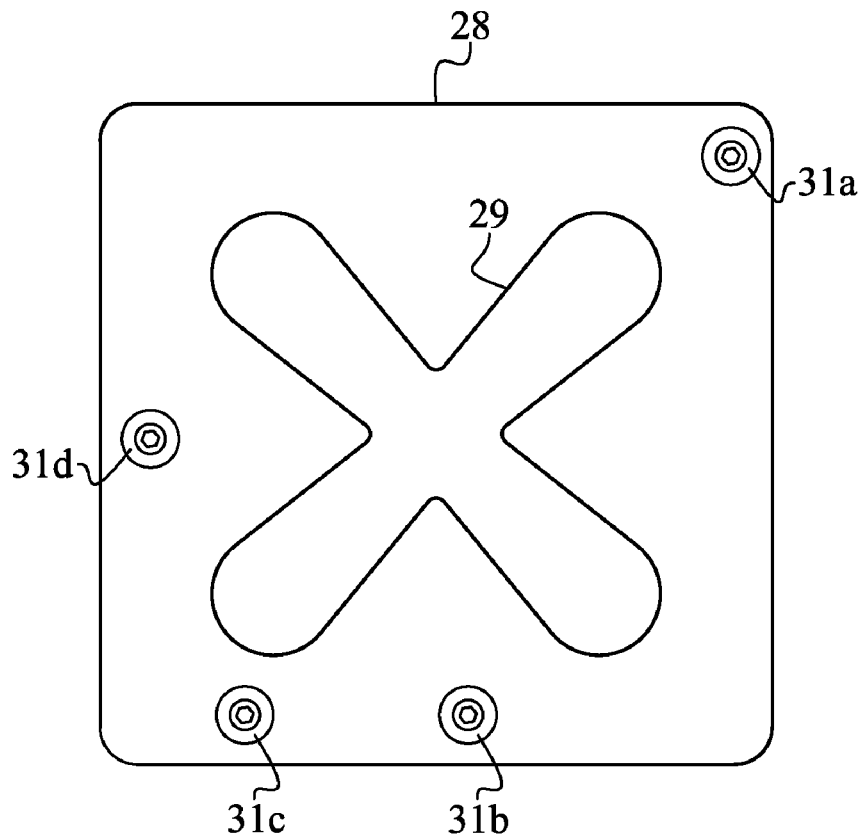
FIG. 3 is a back view of the tool.

FIG. 3 is a back view of the back plate 28 of the battery powered motorized racking tool.

The back plate 28 can have a cutout 29.

The four braces can be connected to the back plate using one fastening per brace, including fasteners 31a, 31b, 31c, and 31d.

Figure 4:
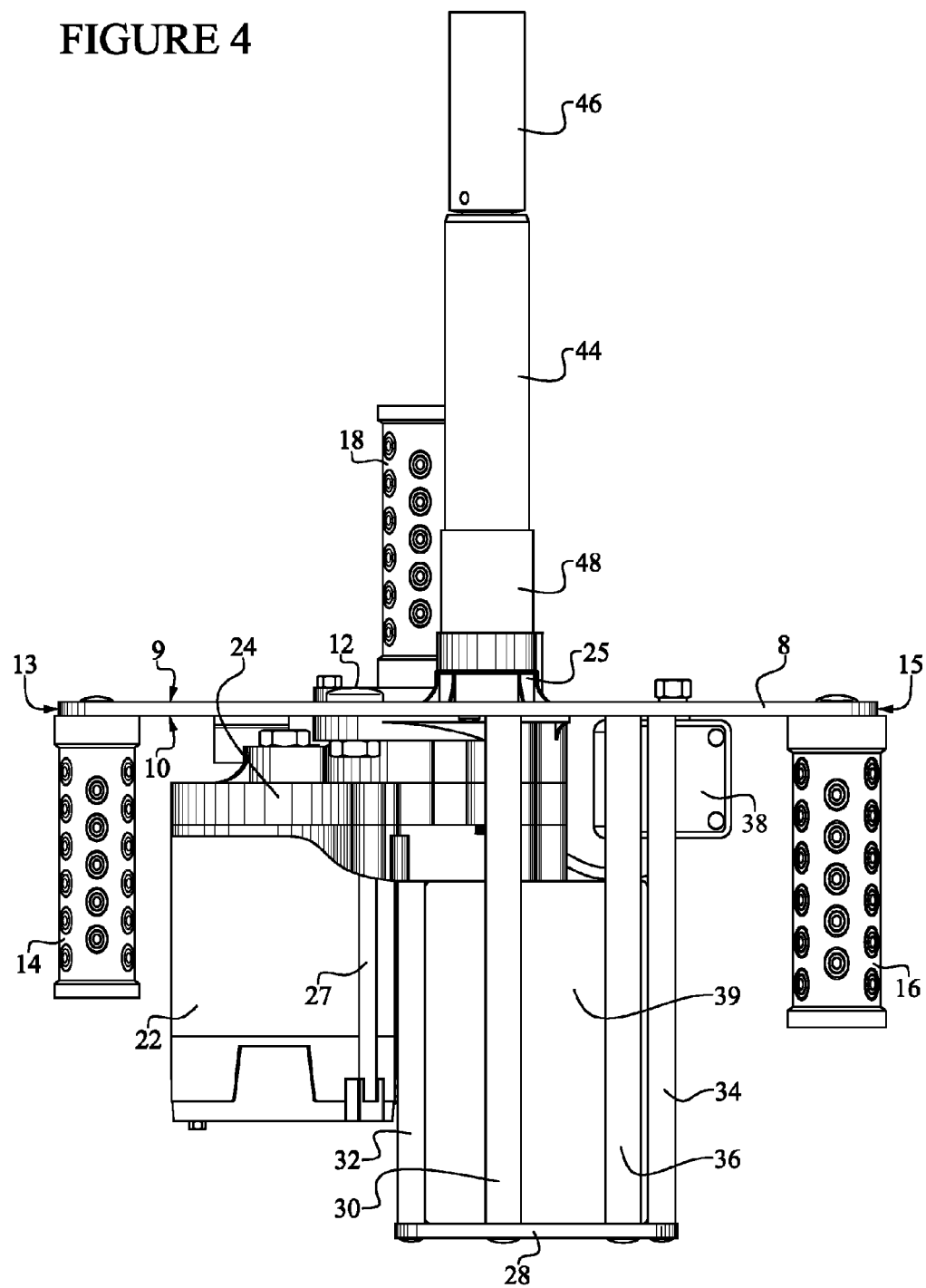
FIG. 4 bottom view of the tool.

FIG. 4 is a bottom view of an embodiment.

The front plate 8 can be connected to the back plate 28 with brace 30, brace 32, brace 34, and brace 36.

A second motor rod 27 can attach the motor 22 to the motor mount 24. The battery 39 can be contained within the braces 30, 32, 34, and 36.

The three handles allow for "top grip" by an operator in addition to two "side grips" allowed by the first and second handles.

More than one handle hole can be formed in the front plate 8. Insulation can be placed on portions of the handle hole as well.

The braces can be used to hold the battery between the front and back plate as well as the motor and motor mount in a lightweight but secure engagement that allows a user to inspect the tool easily. Not having a frame or housing with the tool is a critical feature of embodiments of the invention, allowing parts to be easily replaced and ensuring no heating up because of the good air circulation. The open design can add additional gripping places for an operator in an emergency, and is an important feature to embodiments of the device.

Embodiments can include a perforated housing or an openable slatted design that can function as the braces function, allowing access while keeping the tool lightweight.

The motor rods can be solid metal and small in diameter or lightweight reinforced polymer.

Figure 5:
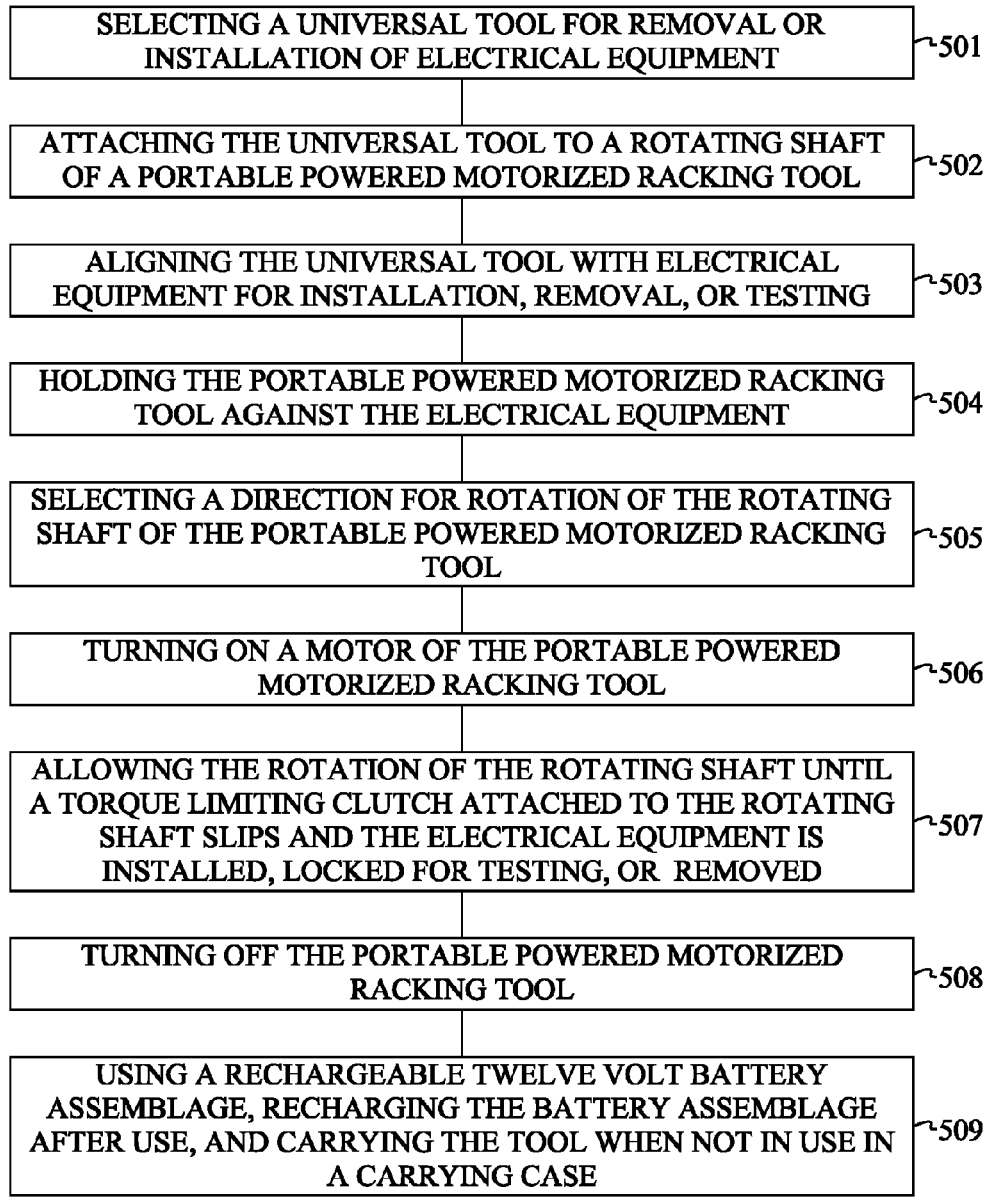
FIG. 5 is a flow chart of an embodiment of the method.

FIG. 5 shows an embodiment of a method for installing or removing electrical equipment.

The method can include selecting a universal tool for removal or installation of electrical equipment, as illustrated by box 501.

The method can include attaching the universal tool to a rotating shaft of a portable powered motorized racking tool, as illustrated by box 502.

The method can include aligning the universal tool with electrical equipment for installation, removal, or testing, as illustrated by box 503.

The method can include holding the portable powered motorized racking tool against the electrical equipment, as illustrated by box 504.

The method can include selecting a direction for rotation of the rotating shaft of the portable powered motorized racking tool, as illustrated by box 505.

The method can include turning on a motor of the portable powered motorized racking tool, as illustrated by box 506.

The method can include allowing the rotation of the rotating shaft until a torque limiting clutch attached to the rotating shaft slips and the electrical equipment is installed, locked for testing, or removed, as illustrated by box 507.

The method can include turning off the portable powered motorized racking tool, as illustrated by box 508.

The method can include using a rechargeable twelve volt battery assemblage, recharging the battery assemblage after use, and carrying the tool when not in use in a carrying case, as illustrated by box 509.

While these embodiments have been described with emphasis on the embodiments, it should be understood that within the scope of the appended claims, the embodiments might be practiced other than as specifically described herein.

What is claimed is:

1. A battery powered motorized racking tool comprising:
   a. a front plate with a shaft hole;
   b. a back plate disposed opposite the front plate;
   c. a first handle and a second handle supported on the front plate, wherein the first handle is opposite the second handle;
   d. a motor mount having a motor mount extension secured to the front plate proximate to the first handle and the second handle and between the front plate and the back plate, wherein the motor mount extension protrudes through the shaft hole;
   e. a motor with a gear assembly attached to the motor mount and contained between the front plate and the back plate;
   f. a torque limiting clutch connected to the gear assembly portion of the motor;
   g. a battery disposed between the front plate and the back plate;
   h. at least four braces disposed between the front plate and the back plate, wherein the at least four braces are positioned for containing the battery and the motor between the at least four braces and the front plate and the back plate;
   i. a power cable connecting the battery to the motor;
   j. a start button secured to the front plate;
   k. an ignition wire connecting the start button to the battery;
   l. a rotatable shaft connected to the torque limiting clutch;
   m. an install switch connected to the motor for causing the motor to rotate the rotatable shaft in a first direction;
   n. a remove switch connected to the motor for causing the motor to rotate the rotatable shaft in a second direction; and
   o. a universal tool connected to the rotatable shaft for engaging electrical equipment for removal, maintenance, or installation.

2. The battery powered motorized racking tool of claim 1, further comprising a handle hole disposed in the front plate.

3. The battery powered motorized racking tool of claim 1, further comprising a third handle fastened to a handle plate, wherein the handle plate is secured to the front plate allowing the third handle to project in a direction opposite to the first handle and the second handle.

4. The battery powered motorized racking tool of claim 1, wherein the front plate and the back plate comprise from 1/8 inch to 3/4 inch plate steel or plate aluminum.

5. The battery powered motorized racking tool of claim 4, wherein the front plate and the back plate are coated with an anti-rust coating, an impact resistant coating, or another corrosion resistant coating.

6. The battery powered motorized racking tool of claim 1, wherein the motor mount is an aluminum hollow support.

7. The battery powered motorized racking tool of claim 1, wherein the motor mount extension comprises a cylindrical threaded opening for removably installing and replacing the rotatable shaft.

8. The battery powered motorized racking tool of claim 1, wherein the motor is a fifty rpm to a one hundred fifty rpm motor or a six volt to twelve volt motor.

9. The battery powered motorized racking tool of claim 1, wherein the battery is at least one twelve volt battery or a plurality of lower voltage batteries connected in series.

10. The battery powered motorized racking tool of claim 1, further comprising at least one motor rod threadably engaging the motor mount on one end and attached to the motor on another end to secure the motor to the motor mount.

11. The battery powered motorized racking tool of claim 1, further comprising a back plate cutout for removing weight from the back plate.

12. The battery powered motorized racking tool of claim 1, wherein the at least four braces are metal rods surrounded by an insulated cover.

13. The battery powered motorized racking tool of claim 1, further comprising a battery charger for engaging the battery and a carrying case for protectively enclosing the battery powered motorized racking tool, wherein all of the components of the tool weigh together less than fifty pounds.

14. The battery powered motorized racking tool of claim 1, wherein the tool has a height from six inches to two feet, a length from one and one half inches to three feet, and a width from six inches to two feet.

15. The battery powered motorized racking tool of claim 1, wherein the rotatable shaft comprises a plurality of locking holes enabling the shaft to engage different types of connectors, different types of universal tools, or different types of components.

16. A fuel cell powered motorized racking tool comprising:
   a. a front plate with a shaft hole;
   b. a back plate disposed opposite the front plate;
   c. a first handle disposed on the front plate and a second handle disposed on the front plate opposite the first handle;
   d. a motor mount having a motor mount extension secured to the front plate proximate to the first handle and the second handle, wherein the motor mount extension protrudes through the shaft hole;
   e. a motor with a gear assembly, wherein the motor is attached to the motor mount;
   f. a torque limiting clutch connected to the gear assembly;
   g. a replaceable fuel cell disposed between the front plate and the back plate;
   h. at least four braces disposed between the front plate and the back plate, where the at least four braces are positioned for containing the fuel cell between the at least four braces and the front plate and the back plate;
   i. a power cable disposed between the fuel cell and the motor;
   j. a start button secured to the front plate;
   k. an ignition wire connecting the start button and the fuel cell;
   l. a rotatable shaft connected to the torque limiting clutch;
   m. an install switch connected to the motor for rotating the rotatable shaft in a first direction;
   n. a remove switch connected to the motor for rotating the rotatable shaft in a second direction; and
   o. a universal tool connected to the rotatable shaft for engaging electrical equipment for removal, maintenance, or installation.

* * * * *